United States Patent [19] BEST AVAILABLE COPY [11] 3,895,212
Maxwell et al. [45] July 15, 1975

[54] FUSION WELDING
[75] Inventors: Ian Stuart Maxwell, Johnstone; Ernest Thomas Marr, Beith, both of Scotland
[73] Assignee: The Babcock & Wilcox Company, New York, N.Y.
[22] Filed: Feb. 19, 1974
[21] Appl. No.: 443,665

Related U.S. Application Data
[63] Continuation of Ser. No. 251,960, May 10, 1972.

[52] U.S. Cl. ................................................ 219/135
[51] Int. Cl.² ........................................... B23K 9/10
[58] Field of Search...... 219/60 R, 60 A, 61, 131 R, 219/131 WR, 135; 323/89 H, 94 H

[56] References Cited
UNITED STATES PATENTS
3,176,215  3/1965  Kusko ............................. 323/89 H
3,335,254  8/1967  Vilkas et al. ..................... 219/60 A
3,388,318  6/1968  O'Brien ........................... 323/94 H
3,668,360  6/1972  Ballis .............................. 219/131

Primary Examiner—J. V. Truhe
Assistant Examiner—Clifford C. Shaw
Attorney, Agent, or Firm—Joseph M. Maguire; Robert J. Edwards

[57] ABSTRACT

A method and apparatus for fusion arc welding of adjoining workpieces including an arc supply circuit and an arrangement for selectively operating the arc supply circuit in constant-power mode.

1 Claim, 13 Drawing Figures

FUSION WELDING

This ia a continuation of application Ser. No. 251,960, filed May 10, 1972.

BACKGROUND OF THE INVENTION

The invention relates generally to welding and particularly to fusion arc welding together the adjoining regions of respective workpieces including the use of a non-consumable electrode having relative traversing movement along the adjoining regions.

In the type of fusion arc welding being considered, a sufficient quantity of heat must be released to insure fusing of the adjoining regions together throughout their whole depth, however, the quantity of heat which is released must not be so great as to cause metal to be lost from the workpieces. Thus the quantity of heat release must be arranged to lie within limits which depend upon the nature, shape and dimensions of the workpieces and other related factors. Consideration should also be given to the fact that the profile of the final weld can be unfavorable as a consequence of an unduly large partial displacement of molten metal under arc force. Even, where heating does not cause loss of metal, difficulty has been experienced, when using known procedures, in obtaining satisfactory weld profiles in the welding together of tubes end to end and in the welding of tubes into tube plates.

Tubes may be fusion welded together end to end by welding apparatus in which the tubes are rotated together with their adjoining ends in contact with one another and disposed beneath a fixed non-consumable type electrode, e.g., a tungsten electrode. Alternatively, where tube rotation is impractical, the welding apparatus comprises an electrode held in a device which imparts to it an orbital movement around the adjoining ends of the stationary tubes. In both cases, an inert gas is used to envelop the arc and to fill the inner tube space. The parameters required for a satisfactory weld may be ascertained from a test specimen where the actual tubes have precise dimensions. However, the average tubes are manufactured with the dimensions being allowed to vary within specified tolerances, thus, where the quantity of heat released is gauged so as to provide full penetration of the fused metal zone including the inner tube surface, the tube areas of lesser wall thickness will receive unnecessarily large quantities of heat as the electrode makes its relative orbital movement about the adjoining tube ends.

Arc force, namely the sum of electromagnetic and plasma streaming forces in the arc, acts on the fused metal zone in the direction of the adjoining tube interiors and where excessive heating takes place, the arc force acting on the inner tube surfaces, perhaps aided by gravity, will cause the formation of large projections of solidified fused metal on the inner surfaces of adjoining tube ends with the concomitant result of producing a concavity of the corresponding outer tube surfaces and effecting a considerable flow restriction, particularly in the case of small diameter tubes. It will be appreciated that the protrusion of fused metal into the tube interior follows the direction of the arc force and is accompanied by a corresponding depression or sag of the fused metal outer surfaces. Also that the arc length and the arc resistance increases with an increase in depth of the outer surface depression and that a limited degree of protrusion of the interior surface is tolerable.

SUMMARY OF THE INVENTION

The present invention proposes the use of a direct current power source for the arc thereby causing the latter to have a substantially constant power characteristic in the operating region.

Accordingly, the present invention provides a method of fusion arc welding together adjoining regions of respective metal workpieces comprising arc current supply means and the use of a non-consumable electrode spaced from and having relative traversing movement along the adjoining regions and including influencing the arc supply means to maintain a predetermined ratio between the arc voltage and the arc current which substantially follows the ratio between the voltage and current in a constant power curve wherein a limited quantity of fused metal, partially displaced at least partly by arc force, protrudes on those region surfaces which are remote from the electrode.

The present invention is also directed at an apparatus wherein the means for influencing the arc current supply means include a multiplier adapted and arranged for multiplying the outputs of means responsive, respectively, to the voltage output and the current output of the arc current supply means and a comparator adapted for comparing the output of the multiplier with a fixed value and for influencing the arc current supply means to operate in constant-power mode.

DESCRIPTION OF THE PREFERRED EMBODIMENT

Figure 1:
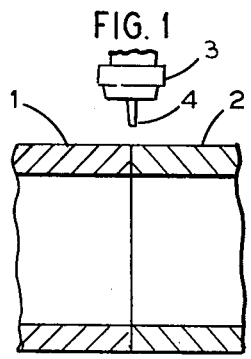
FIG. 1 is a detail sectional view showing the abuting tube end region and a stationary electrode spaced thereabove in accordance with the invention.

With reference to FIG. 1, there is shown a method of autogeneously welding tubes 1 and 2 together in end to end fashion. The tubes 1 and 2 are arranged with their end sections extending along a common horizontal axis and their adjoining end faces in contact with one another and are rotated about their common axis beneath a stationary welding head adapted for tungsten-inert gas welding.

The welding head comprises a holding device 3 for a non-consumable electrode 4 which projects therefrom and is preferably of pin-like form, the holder 3 includes a passage for the delivery of an annular stream of inert gas in the direction of and around the electrode tip. The inert gas may be argon while the non-consumable electrode may be of thoriated tungsten. It will be understood, however, that there may be other suitable substitutes for the inert gas and non-consumable electrode respectively.

The welding head and the tubes 1 and 2 are arranged so that the electrode 4 projects vertically downward and normal to the peripheral tube surfaces at the function of the tubes 1 and 2. The positive terminal of a direct current power source is connected to the tubes 1 and 2 and to ground whereas the negative terminal is connected to the electrode 4. The welding together of tubes 1 and 2 is achieved by maintaining an arc between the electrode 4 and the tubes 1 and 2 and rotating the latter about their common axis. At the start of the welding operation, the arc is struck by means of a suitable expedient such as applying high tension pulses or high tension alternating current, the tubes may be kept stationary until a certain amount of heat has been released and are thereafter rotated while the heat penetration increases, with tube rotation being continued until at least 360° of welding at full penetration is achieved. Following 360° of full penetration, the tube rotation is normally continued during a weld termination or run-out period in which the welding current is reduced continuously or in steps.

Figure 2:
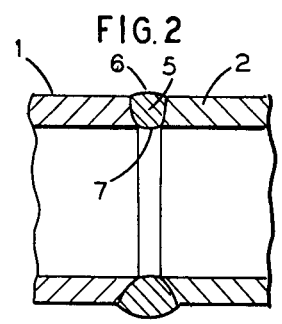
FIG. 2 is a detail sectional view showing the abuting tube ends weldably united in accordance with the invention.

With reference to FIG. 2, the tubes 1 and 2 are shown as being joined by a satisfactory weld, the fused metal comprising a zone 5 which extends or penetrates from an outer surface band 6 to an inner surface band 7, the latter being of narrower width. Both surface bands 6 and 7 are slightly convex across their respective widths, this being the result of tubes 1 and 2 being drawn slightly together in the cooling of the fused metal, however, the inner surface band 7 does not project sufficiently, into the joint tube bore, to form an undue restriction thereof.

Figure 3:
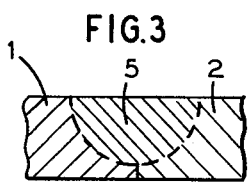
FIGS. 3 and 4 are detail sectional views of unacceptable type butt welds.
Figure 4:
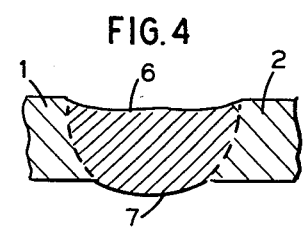

The weld, if unsatisfactory around the tube junction or any angular portion thereof, may be undesirable for either one of two main reasons. With reference to FIG. 3, if considerably too little metal is fused by the welding, the fused metal zone 5 does not penetrate through the inner surfaces of tubes 1 and 2 thereby rendering the weld defective. With reference to FIG. 4, if considerably too much metal is fused by the welding, the solidified fused metal inner surface band 7 projects appreciably into the joint tube bore thereby resulting in an undue restriction thereof. Where, as in FIG. 4, the radially inward projection of band 7 is very pronounced, it may be accompanied by a depression having a concave configuration across the width of the outer surface band 6 thereby weakening the tube joint. Moreover, where a grossly excessive quantity of metal is fused, the molten metal will fall away from the welding zone.

General procedure calls for the making of preliminary welding trial runs prior to the actual welding of the tubes. The trial runs will include the use of tube sections of the same nominal and internal diameters as those of the actual tubes to be welded in order to determine the combination of parameters which will result in a satisfactory weld; the variables being the distance between the electrode and the work, the speed of tube rotation and the current and voltage values. The welding of the actual tubes is based on the chosen combination of parameters and the use of a direct current power source with a characteristic of output volts (ordinates) and output amperes (abscissae) which slopes steeply downward at the point of intersection with the arc characteristic. A power source output characteristic which is vertical at the point of intersection with the arc characteristic would signify constant current welding. It has been found, however, that better results are obtained when using a direct current power source whose output characteristic has the same downward slope as a constant power characteristic at the point of intersection with the arc characteristic.

Figure 5:
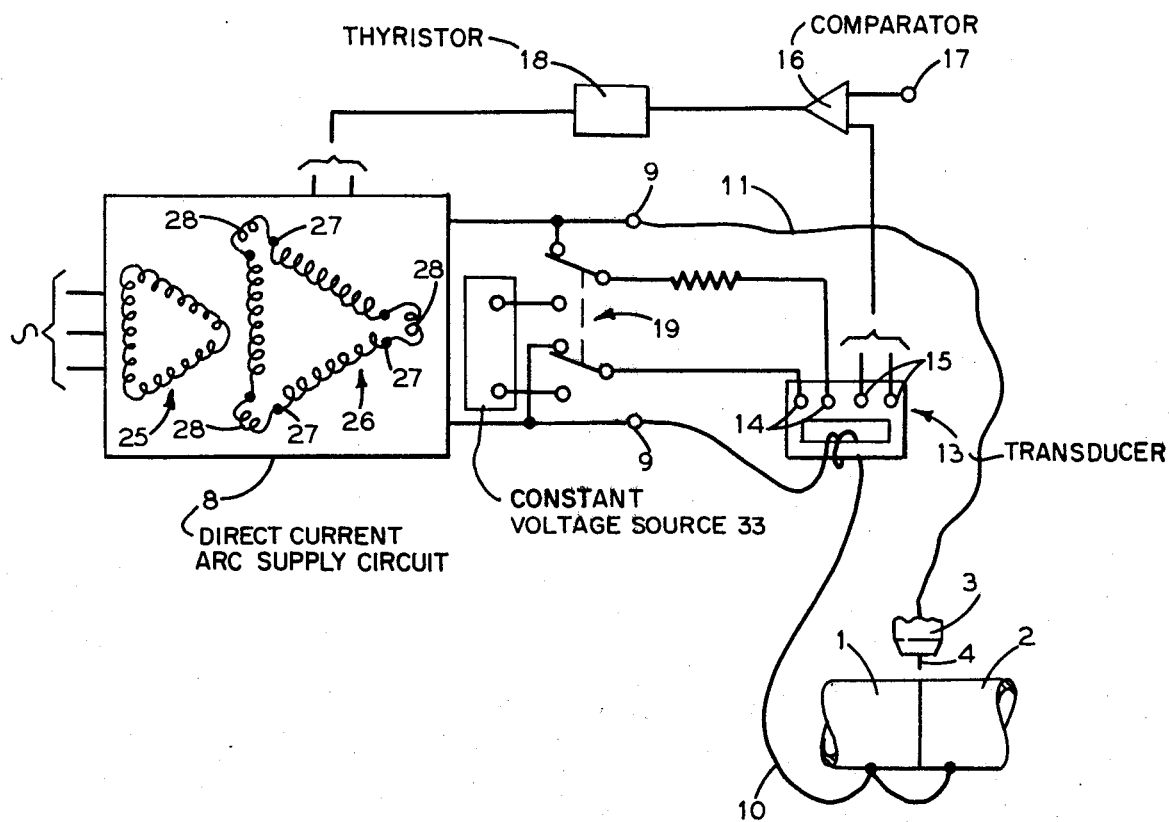
FIG. 5 shows an arrangement for the application of direct current power for welding in a constant power mode.

With reference to FIG. 5, a direct current power source 8, energized by a three-phase alternating current source, effects a rectification of the alternating current and supplies a direct current output at its terminals 9, of which the positive terminal is connected by a cable 10 to the tubes to be welded 1 and 2, respectively, and the negative terminal is connected by cable 11 to the electrode 4 in the welding head 3. The cable 10 is lined with the magnetic ring core 12 of a transducer 13 of the type which utilizes the Hall effect in a thin slice of semi-conductor in a gap of the ring core, for example, a type FB32AEI Hall effect transducer. In accordance with the Hall effect, an output voltage proportional both to the magnitude of a magnetic field across the semi-conductor and to the value of a current passed through the semi-conductor at right angles to the magnetic field is generated across the semi-conductor at right angles both to the magnetic field and to the flow of current. The transducer 13 is provided with a pair of input terminals 14 for passing current through the semi-conductor. The input terminals 14 are connected, respectively, to the positive and negative terminals 9 of the power source. The transducer 13 is provided with a pair of output terminals 15 which connect to a comparator 16 and accommodate the passage of generated voltage thereto. The comparator 16 receives a fixed value through a terminal 17, this value being representative of the desired product of voltage and current, and compares the fixed value against the generated voltage value with the resultant difference determining the input to a thyristor amplifier 18, the latter produces a current whose magnitude reflects the difference between the fixed and generated voltage values and which passes through a control circuit in the direction current power source 8.

The direct current power source 8 is adapted so as to be controlled by varying the degree of saturation of magnetic cores therein. The power source 8 may comprise a threephase transformer having a delta-connected primary 25 and a basically delta-connected secondary 26, the latter including three angle points 27 which are connected through three respective rectifier elements (not shown) in the forward directions thereof to the positive one of the terminals 9 while also being connected through another three respective rectifier elements (not shown) in the reverse direction thereof to the negative one of the terminals 9. In addition to the appropriate secondary winding connected between each pair of angle points 27 of the secondary delta 26, there are also respective magnetic reactors or transductors 28 connected in series therewith. Each of the three magnetic reactors 28 carries two control windings (not shown) for unidirectional current, one of these windings is traversed by the control circuit current associated with the amplifier 18 while the other winding is traversed by the welding current. The currents in the aforementioned windings determine the degree of saturation of the magnetic reactor cores thereby determining the voltages applied by the secondary delta 26 to the rectifier elements and consequently determining the output of the direct current power source 8. In the event that the arc voltage and the arc current depart from their nominal values, the controls exerted by the currents in the control windings are such as to maintain the power output of the direct current source 8 substantially constant.

Figure 6:
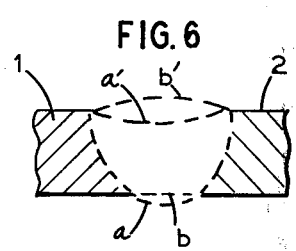
FIG. 6 is a detail sectional view of a butt weld made in accordance with this invention.

During the welding process, the molten metal beneath the electrode 4 is in a fluid state and is therefore capable of responding to forces imposed thereon, one of which is the arc force while another is the force of gravity, both act in downward direction with the latter being the sum of the electromagnetic force and the plasma streaming force. These forces cause the molten metal to sag and protrude into the joint tube bore as indicated by the dotted line $a$ of FIG. 6, with the upper surface sinking as indicated by the dotted line $a'$ of the same figure. As the tubes rotate, the molten metal which has been subjected to the arc force is relieved of that force and the sag has an opportunity of diminishing before the metal solidifies; thus the lower and upper surfaces thereof will tend to assume respective outlines which are convex as indicated by the dotted lines $b$ and $b'$ of FIG. 6.

One cannot normally expect for conditions to be absolutely uniform throughout the welding process during a 360° rotation of the tubes. One reason being that the manufacturing tolerances will allow a degree of angular variation in the tube radii at the points of the tube support as well as the abutting tube ends thereby causing slight variations in the distances of the tubes 1 and 2 from the electrode 4. Another reason being that the angular variation in the tube wall thickness which, while within manufacturing tolerances, will nevertheless, cause a variation in welding conditions.

If, as tubes 1 and 2 rotate, an angular location where the wall thickness of both tubes is smaller passes underneath the electrode 4, then the width of the molten zone increases with a concomitant increase in the surface sag. Whenever an increase in surface sag occurs, there is a corresponding increase in the distance between the electrode tip and the portion of molten metal upper surface being subjected to the arc force thereby requiring a greater arc voltage. As a result of the aforedescribed feed-back control of the direct current power source 8, whenever there is an increase in the arc voltage there is a corresponding decrease in the current so that the product of voltage and current is maintained at a constant value thus closely limiting the sag in the molten metal and virtually eliminating the risk of excessive protrusion of solidified fused metal into the joint tube bore. Conversely, if as the tubes 1 and 2 rotate, an angular location where the wall thickness of both tubes is greater passes underneath the electrode, there is the risk that the fusion zone will fail to reach the inner tube surface as a result of a reduction in arc voltage, in such case the afore-mentioned feedback control will offset the voltage reduction by increasing the current thereby maintaining the product of voltage and current at a constant value and insuring that the fusion zone penetrates the full thickness of the tube joint. It will be understood that the aforedescribed feature of the invention is capable of compensating for other variations in welding conditions and thus provides the means for obtaining uniform welds without resorting to the costly prerequisite of close manufacturing tolerances.

Figure 7:
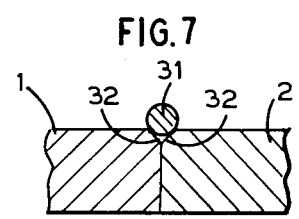
FIG. 7 is a detail sectional view showing the application of filler wire at abutting tube ends to be welded.

It may be found desirable to add a constant quantity of filler metal per unit length of weld in order to eliminate any possibility of concave profiles in the outer band or surface of fused metal in the final weld. The addition of filler metal to the adjoining ends of the rotating tubes 1 and 2 may be effected by steadily feeding a fusible weld wire from a position laterally of the electrode 4 along the plane of the weld line and into the arc region. Alternatively, the wire feeding means is not necessary where the filler metal is provided as a fusible wire previously laid down along the line of the intended weld. Referring to FIG. 7, in order to insure the proper positioning of a circlet of filler wire 31, so that it may be held to the tubes 1 and 2 by its own resilience, the outer corners 32 of the abutting tube ends may be chamfered thereby providing an annular recess of triangular cross-section for receiving the filler.

In the case where tube rotation is not practical, the preferred arrangement is to have the common axis of tubes 1 and 2 lying along a vertical plane with the welding head being orbited around the tubes 1 and 2 along the weld line. However, where the common axis of tubes 1 and 2 must extend along a horizontal plane and the tubes cannot be rotated, the welding head must be orbited in a vertical plane around the tubes 1 and 2 along the weld line. The latter position is least preferred because of varying welding conditions caused by the varying angular positions between the directions of the force of gravity and the arc force. Where the force of gravity opposes the arc force as in the lowermost arc of the tube junction, there may occur a variation in the quantity of metal being fused at the welding point, however, the risk of excessive protrusion of solidified fused metal may be somewhat offset by these forces being opposed to one another.

Figure 8:
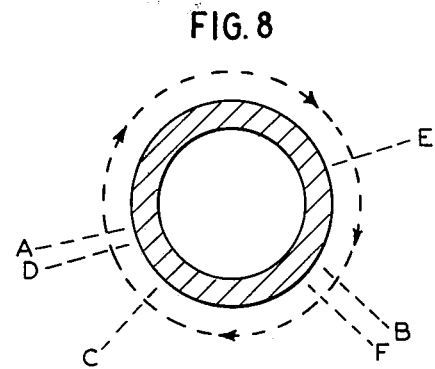
FIG. 8 shows the angular locations around a tube followed through by an orbiting welding head in accordance with a welding sequence.

Referring to FIG. 8, there is shown a welding procedure which provides welds of consistent quality and calls for striking the arc and maintaining the welding head stationary for 13 seconds at a 9 o'clock position with relation to the orbital path while applying a relatively high arc current. The welding head is thereafter rotated at constant angular velocity for 81 seconds through 360° rotation while passing through angular positions B, C, D, E and F. From angular position A to angular position B, the latter being at about the 5 o'clock position, the direct current power source 8 is arranged to be operated at a constant power mode. From angular position B to angular position C, the latter being at about 7 o'clock position, the direct current power source 8 is arranged to operate at a constant current mode, the quantity of current being somewhat less than that nominally delivered during the arc AB. From angular position C to angular position D, the latter being at about 9 o'clock position, the direct current power source 8 was operated in constant power mode with a nominal current about the same as that delivered during the arc BC. From angular position D to angular position E, the latter being at about the 3 o'clock position, the direct current power source 8 was operated in the constant power mode with a nominal current slightly greater than during the arc CD. During the arc EF, which took about 12 seconds and ended the operation, the current was reduced in stages.

The arrangement shown in FIG. 5 may be used in conjunction with an orbiting welding head by enabling the power source 8 to operate at a constant current mode. This may be accomplished by providing a transfer means 19 for disconnecting the transducer input terminals 14 from the terminals 9 and connecting the former terminals to a pair of terminals 33 representing a source of constant voltage of an appropriate value. The transfer necessary for changing the modes of operation of the direct current source and for changing the power value applied at the terminal 17 may be effected through timing devices associated with the rotating motor which is used to drive the oribiting welding head.

Figure 9:
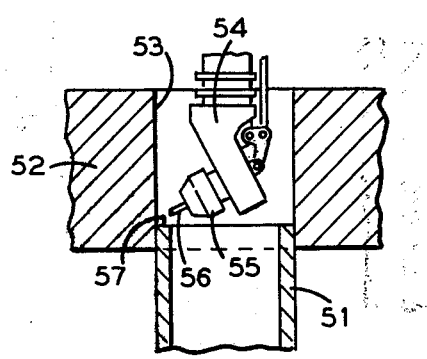
FIG. 9 is a sectional view of a tube end partially extending through a tube sheet in preparation for its being welded thereto.

Referring to FIG. 9, there is shown a method of autogeneously welding a tube end 51 into a tube sheet or plate 52. The tube plate 52 is disposed so as to extend along a horizontal plane while the tube end 51 has its longitudinal axis extending along a vertical plane into the plate 52 through an appropriate bore 53. A welding head 54 adapted for tungsten-inert gas welding is placed within the bore 53. The welding head 54 comprises a holder 55 and a non-consumable electrode 56 of pin-like form projecting therefrom and includes a passage for delivering inert gas to the tip of the electrode 56. The welding head 54 is arranged for rotation about the vertical axis of bore 53 in such manner as to enable the electrode 56 to project radially outward and downward along a plane extending through the axis of rotation with the electrode tip being at a suitable position in the angle between the wall of bore 53 and the upper end surface 57 of tube end 51. The positive terminal of a direct current power source is connected to the tube plate 52 and to ground while the negative terminal is connected to the electrode 56. Welding is effected by maintaining an arc between the electrode 56 and the adjacent metal during rotation of the welding head 54. During the welding process, the arc is bathed in a stream of inert gas delivered by the welding head 54, while an inert gas atmosphere is maintained around the tube end portion which lies below the tube plate 52. After the arc has been struck at the start of the welding operation, the welding head 54 may be held stationary for a measured period of time and thereafter rotated, normally, through more than 360° so that all portions of the weld zone are assured of full penetration and is then finally rotated through a run-out period during which the welding current is reduced.

Figure 10:
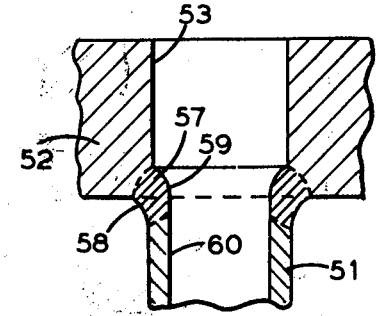
FIG. 10 is a sectional view showing the tube end and tube sheet of FIG. 9 welded in accordance with the invention.

Referring to FIG. 10, there is shown the tube end 51 after it has been satisfactorily welded to the plate 52. The tube and the plate metals are joined by a fused metal zone 57 which has an outer surface 58 extending across the angle formed between the base of plate 52 and the outer edge of the tube 51 and which has a relatively shallow ogee profile 59 with its upper end being tangent to the inner bore surface and its lower end being tangent to the tube inner surface 60.

Figure 11:
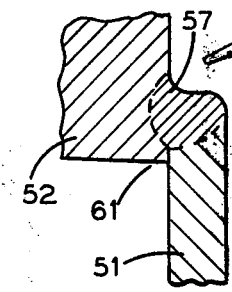
FIGS. 11, 12 and 13 are detail sectional views of unacceptable type weld between a tube end and tube sheets.

With reference to FIG. 11, there is illustrated a weld which is unsatisfactory because the fused metal zone 57 does not fully penetrate the metal thickness at the tube-plate junction 61 due to insufficient metal having been fused between the lower surface of plate 52 and the outer surface of tube 51.

Figure 12:
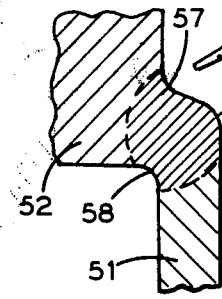

With reference to FIG. 12, there is illustrated a weld which is unsatisfactory eventhough the fused metal zone 57 fully penetrates the metal thickness at the tube-plate junction and does form a fillet 58 between the lower surface of plate 52 and the outer surface of tube 51. The defectiveness of this weld is due to the formation of a somewhat protruberant shoulder 62 in the weld profile thus impeding the smooth fluid flow from the tube 51 to the tube bore or vice versa.

Figure 13:
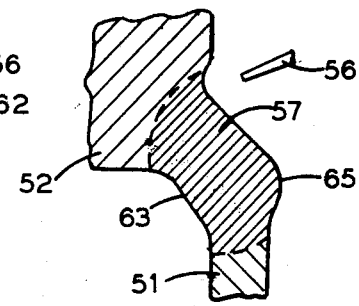

With reference to FIG. 13, there is illustrated a weld which is unsatisfactory due to the fusing of an excessive quantity of metal resulting in a large displacement of fused metal into the angle formed between the lower surface of plate 52 and the outer surface of tube 51 as indicated at 63. The resultant displacement of fused metal causes the weld to be undercut at the upper end of its inner profile as indicated at 64 and to protrude toward the lower end of its inner profile as indicated at 65, the former defect weakens the weld while the latter causes a restriction to fluid flow.

Preliminary welding tests are generally run so as to determine the operating variables which will provide a satisfactory weld. The procedure for welding the tube end 51 into the tube plate 52 is carried out with a direct current power source which is adapted to have an output characteristic that has the same downward slope as a constant power characteristic at the point of intersection with the arc characteristic. During the welding process, the molten metal, having fully penetrated the metal thickness, is urged under the gravity and arc forces into the space 61 formed in the angle between the lower surface of tube plate 52 and the outer surface of tube 51 and is partly displaced therein. The slight variations in welding conditions, which are normally encountered, will be compensated for and the development of the type of profile associated with insufficient or excessive metal fusion will be avoided. Thus, whenever the rotating welding head comes to an angular position corresponding to a slightly thinner tube wall, the metal is more rapidly fused and the displacement of molten metal toward the space 61 in the angle between the lower surface of plate 52 and the outer surface of tube 51 commences to increase; this in turn is accompanied by a requirement for increased voltage and a corresponding reduction in current, the compensating effect for maintaining the product of the voltage and current at a substantially constant value eliminates the risk of undercutting the weld as is characteristic with excessive metal fusion. Conversely, at an angular position corresponding to a slightly thicker tube wall, the compensating effect of maintaining the product of the voltage and current at a substantially constant value eliminates the protrusion of fused metal as is characteristic with insufficient metal fusion.

The invention as afore-described is directed to the butt welding of tubes and the welding of tube ends to tube plates, however, the invention is equally applicable to the welding together of other workpieces, e.g., abutting edges of plates, with or without the addition of filler metal.

What is claimed is:

1. A fusion arc welding apparatus adaptable for use with rotating and stationary work pieces and comprising a welding head including non-consumable electrode means disposed for weldably uniting adjoining regions of the workpieces, said welding head being rotatable along an orbital path about the workpieces, the improvement comprising a constant voltage source and a direct current arc supply circuit, a transducer, transfer means connected with the transducer, said transfer means being operable for selecting between having the transducer connected to receive an input current from the constant voltage source thereby influencing the arc supply circuit to operate in constant-current mode and having the transducer connected to receive an input current from the arc supply circuit thereby influencing the circuit to operate in constant-power mode, said transducer having a semi-conductor with the input current passing therethrough, separate electric cable means connecting the arc supply circuit to said workpieces and electrode means, said workpieces' related cable means having an intermediate portion thereof wound about the semi-conductor to produce a magnetic field there-across, said magnetic field interacting with the current passing through the semi-conductor to generate an output voltage proportional to the product of the magnitude of the magnetic field and the level of semi-conductor current, a comparator connected to the transducer to receive said generated voltage and to means providing a predetermined voltage input, said comparator producing an output voltage representative of the resultant difference between said generated and predetermined voltages, a thyristor connected to the comparator to receive the output voltage therefrom, said thyristor producing a current output representative of the comparator voltage output, and said arc supply circuit being connected to the thyristor and responsive to said current output to regulate the level of current flowing to said electrode means and work pieces.

* * * * *

UNITED STATES PATENT AND TRADEMARK OFFICE
CERTIFICATE OF CORRECTION

PATENT NO. : 3,895,212
DATED : July 15, 1975
INVENTOR(S) : Ian Stuart Maxwell et al It is certified that error appears in the above-identified patent and that said Letters Patent are hereby corrected as shown below:

For the Assignee, "The Babcock & Wilcox Company"

should read --Babcock & Wilcox, Limited --.

Signed and Sealed this sixth Day of January 1976

[SEAL]

Attest:

RUTH C. MASON
Attesting Officer

C. MARSHALL DANN
Commissioner of Patents and Trademarks